(12) United States Patent
Boutboul

(10) Patent No.: US 7,844,663 B2
(45) Date of Patent: Nov. 30, 2010

(54) METHODS, SYSTEMS, AND COMPUTER PROGRAM PRODUCTS FOR GATHERING INFORMATION AND STATISTICS FROM A COMMUNITY OF NODES IN A NETWORK

(75) Inventor: Irwin Boutboul, Jersey City, NJ (US)

(73) Assignee: International Business Machines Corporation, Armonk, NY (US)

( * ) Notice: Subject to any disclaimer, the term of this patent is extended or adjusted under 35 U.S.C. 154(b) by 881 days.

(21) Appl. No.: 11/456,373

(22) Filed: Jul. 10, 2006

(65) Prior Publication Data

US 2008/0010247 A1  Jan. 10, 2008

(51) Int. Cl.
*G06F 15/16* (2006.01)

(52) U.S. Cl. ............... 709/204; 709/203; 370/254; 370/259

(58) Field of Classification Search ............ 709/204
See application file for complete search history.

(56) References Cited

U.S. PATENT DOCUMENTS

| | | | | |
|---|---|---|---|---|
| 6,137,862 A * | 10/2000 | Atkinson et al. | ......... | 379/32.01 |
| 6,459,700 B1 * | 10/2002 | Hoang | ......... | 370/401 |
| 6,947,988 B1 * | 9/2005 | Saleh | ......... | 709/226 |
| 6,981,020 B2 * | 12/2005 | Miloslavsky et al. | ......... | 709/204 |
| 7,162,413 B1 * | 1/2007 | Johnson et al. | ......... | 704/9 |
| 7,164,657 B2 * | 1/2007 | Phaal | ......... | 370/235 |
| 7,630,986 B1 * | 12/2009 | Herz et al. | ......... | 1/1 |
| 2003/0115299 A1 * | 6/2003 | Froyd et al. | ......... | 709/220 |
| 2004/0133640 A1 * | 7/2004 | Yeager et al. | ......... | 709/204 |
| 2004/0210627 A1 | 10/2004 | Kroening | | |
| 2004/0215590 A1 | 10/2004 | Kroening | | |
| 2005/0160340 A1 * | 7/2005 | Abe et al. | ......... | 714/746 |
| 2005/0165854 A1 | 7/2005 | Burnett et al. | | |
| 2005/0210110 A1 * | 9/2005 | Li | ......... | 709/206 |
| 2006/0040678 A1 * | 2/2006 | Kwon | ......... | 455/456.3 |
| 2007/0038705 A1 * | 2/2007 | Chickering et al. | ......... | 709/206 |
| 2007/0063854 A1 * | 3/2007 | Zhang et al. | ......... | 340/576 |
| 2007/0117574 A1 * | 5/2007 | Watanabe | ......... | 455/456.1 |
| 2008/0022177 A1 * | 1/2008 | Abe et al. | ......... | 714/746 |
| 2008/0036778 A1 * | 2/2008 | Sheha et al. | ......... | 345/502 |
| 2008/0225779 A1 * | 9/2008 | Bragiel et al. | ......... | 370/328 |
| 2008/0233935 A1 * | 9/2008 | Garg | ......... | 455/417 |

(Continued)

OTHER PUBLICATIONS

Loureiro, Secure Data Collection with Updates, 1999, pp. 21.*

*Primary Examiner*—Firmin Backer
*Assistant Examiner*—Arvin Eskandarnia
(74) *Attorney, Agent, or Firm*—Cantor Colburn LLP; Derek Jennings

(57) ABSTRACT

A method, system, and computer program product for gathering information and statistics from a community of agent nodes in a network is provided. The method includes generating a process request. The process request includes a rule for discovering each of the agent nodes in the community and a rule for accessing local information stored on each of the agent nodes. The local information represents activities conducted by end users at each of the agent nodes. The process request also includes a set of rules for classifying data comprising the local information and developing a cumulative profile resulting from the classifying. The cumulative profile includes generic information that is descriptive of collective activities conducted by the end users and is absent information that personally identifies any of the end users.

20 Claims, 4 Drawing Sheets

U.S. PATENT DOCUMENTS

2008/0248820 A1* 10/2008 Lohtia ........................ 455/466
2009/0177484 A1* 7/2009 Davis et al. .................... 705/1
2009/0222895 A1* 9/2009 Banga et al. ................... 726/5

* cited by examiner

300

30% MALES BETWEEN 18-30 YRS TRAVELLED OUT OF STATE BETWEEN 01-01-2005 AND 12-31-2005

AVERAGE LENGTH OF TRAVEL 3 DAYS

3% OF MALES - TRAVEL DESTINATION OF CHICAGO

4% OF MALES - TRAVEL DESTINATION OF NEW YORK CITY

2% OF MALES - TRAVEL DESTINATION OF ATLANTA

10% OF TRAVEL DAYS SPENT OVER WEEKEND

FIG. 3

METHODS, SYSTEMS, AND COMPUTER PROGRAM PRODUCTS FOR GATHERING INFORMATION AND STATISTICS FROM A COMMUNITY OF NODES IN A NETWORK

BACKGROUND OF THE INVENTION

The present disclosure relates generally to information processing and, in particular, to methods, systems, and computer program products for gathering information and statistics from a community of nodes in a network.

With the ever-increasing amount of information available electronically, data mining and information collecting regarding consumer behaviors have become a necessity in order for businesses to stay competitive. For example, marketing units strive to collect various types of information on consumers in order to develop new strategies and businesses. Currently, in order to foster and facilitate new business opportunities, enterprises utilize profile information provided by consumers or other individuals (e.g., end users) who seek information or products from the enterprises (e.g., via online searches, website activity, etc.). Statistical analysis of this end user information is typically performed at a centralized processing device of the enterprise or by a representative of the enterprise (e.g., third-party data mining/data warehouse service provider). Typically, search engines of the business enterprise system create copies of the content, which are then processed at the centralized system.

In order to address consumer privacy concerns, various schemes have been developed such that before user information is accessed and collected, it is either encrypted or scrambled in such a way that it is not possible (or is at least very difficult) to specifically identify a particular end user who is subject to the collected information. However, in these cases, the information is still required to transit at some point from the end user to a central location in order for it to be processed. For example, in a telephone survey, the individual is required to provide information to the business enterprise via the telephone line. Likewise, in the case of Internet surveys, the user information is sent back to a surveying server, etc., from the collection source of the business enterprise.

It is not surprising that many people are often reluctant to send their private information anywhere. Thus, when businesses desire to analyze very sensitive data such as consumer spending (e.g., credit cards, bills, shopping behavior, etc.) for the purpose of defining behavioral trends, this privacy can become a major issue that needs to be addressed.

What is needed, therefore, is a way to gather information and statistics from individuals and create profiles from this statistical information that are devoid of any information that is considered to be private including information that personally identifies any of the individuals, thereby protecting each individual's right to privacy.

BRIEF SUMMARY OF THE INVENTION

Embodiments of the invention include a method, system, and computer program product for gathering information and statistics from a community of agent nodes in a network is provided. The method includes generating a process request. The process request includes a rule for discovering each of the agent nodes in the community and a rule for accessing local information stored on each of the agent nodes. The local information represents activities conducted by end users at each of the agent nodes. The process request also includes a set of instructions that includes rules for classifying data comprising the local information and developing a cumulative profile resulting from the classifying. The cumulative profile includes generic information that is descriptive of collective activities conducted by the end users and is absent private information including information that personally identifies any of the end users.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 3 is a cumulative profile with sample data generated via the agent profile processes in exemplary embodiments.

The detailed description explains the preferred embodiments of the invention, together with advantages and features, by way of example with reference to the drawings.

DETAILED DESCRIPTION OF THE INVENTION

Methods, systems, and computer program products for gathering information and statistics from a community of agent nodes in a network via agent profile processes are provided in accordance with exemplary embodiments. The agent profile processes provide the capability to gather information locally stored on a community of agent nodes, analyze the local information, and create agent profiles resulting from the analyzing. The agent profiles are generated using a process that provides useful statistical information concerning activities conducted via the agent nodes while obscuring any private information, such as personally identifying information concerning individual agent nodes in the community, thereby protecting the privacy interests of each member of the community.

Figure 1:
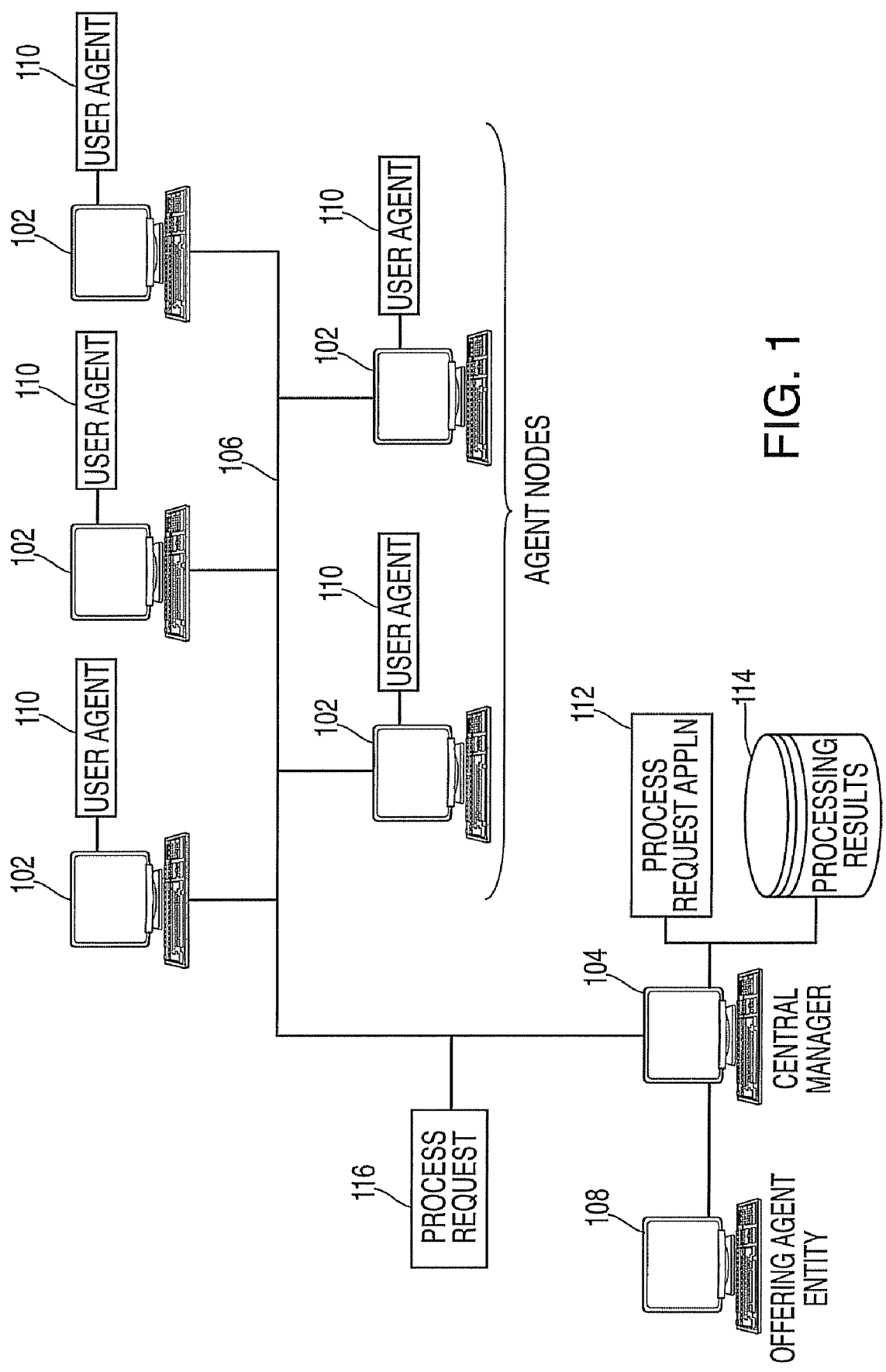
FIG. 1 is a block diagram depicting a system upon which agent profile processes may be implemented in accordance with exemplary embodiments.

Turning now to FIG. 1, a block diagram of a system upon which the agent profile processes may be implemented in exemplary embodiments will now be described. The system of FIG. 1 includes a community of agent nodes 102 in communication with a central manager system 104 via a network 106. In exemplary embodiments, the agent nodes 102 represent autonomous computer processing devices (e.g., desktop computers, laptops, etc.) through which end users (consumers, business enterprises, etc.) conduct activities over one or more networks (e.g., network 106). These activities may include Web searches, communications (e.g., email, instant messaging, electronic facsimile, etc.) in addition to e-commerce transactions (e.g., purchases, sales of goods and/or services), to name a few.

The central manager system 104 may likewise be implemented by a computer processing device; however, in exemplary embodiments, central manager system 104 is implemented as a high-speed processing device (e.g., a mainframe computer) that handles a large volume of transactions via one or more networks, such as network 106.

Central manager system 104 may be operated by a service enterprise that facilitates the agent profile processes described herein. In exemplary embodiments, central manager system 104 generates process requests for transmission over network 106 to the community of agent nodes 102. The process requests are generated via a process request application 112 executed on the central manager system 104. A process request 116, as shown in FIG. 1, is in transit via network 106 for purposes of illustration. Each process request 116 may be configured to derive particular information from the community of agent nodes 102. For example, one process request 116 may be designed to gather information relating to purchasing patterns of the end users of agent nodes 102, while another process request may be designed to gather information relating to web sites visited by end users. In further exemplary embodiments, the process request 116 may be configured to capture information regarding activities conducted by a defined population within the community (e.g., defined activities conducted by males between the ages of 18 and 30). These, and other types of activities, may be captured by the process requests generated by the central manager system 104.

The system of FIG. 1 further includes an offering agent entity 108 in communication with the central manager system 104 via any suitable communications technologies, e.g., Internet. Offering agent entity 108 may be implemented as a network-enabled computer processing device. In exemplary embodiments, offering agent entity 108 represents a client of the central manager system 104 which requests various profile information relating to a community of agent nodes, such as agent nodes 102. For example, the offering agent entity may be a corporate enterprise seeking demographic information for purposes of market planning.

The central manager system 104 transmits process requests to the community (e.g., via a scheduler component of the process request application 112) and each agent node 102 facilitates the movement of the requests 116 in the transmission path (e.g., traversal of network 106) until completion (e.g., when every agent node 102 in the community has been accessed by the process request 116).

The agent nodes 102 may be a grid-implemented community; that is, a distributed computing environment that enables resource virtualization, on-demand provisioning, and service (resource) sharing between entities. In exemplary embodiments, the community of agent nodes 102 communicate in a peer-to-peer network. In this exemplary implementation, each of the agent nodes 102 execute a user agent application 110 that resides on the agent node 102 and enables communication among agent nodes 102, as well as between each agent node 102 and the central manager system 104. The user agent application 110 may be a filing sharing program that distributes files among computer systems that utilize the application 110. Each agent node 102 that receives the process request 116 checks to see whether it has already received the request 116, as well as determines whether the particular request 116 applies to the agent node 102, as will be described further in FIG. 2.

As indicated above, process requests (e.g., request 116), are created via the process request application 112 executing on central manager system 104. In exemplary embodiments, the process requests 116 include, e.g., rules for discovering other agent nodes in the community, rules for accessing local information stored on agent nodes, and a set of instructions/rules for handling the information. The set of instructions may process the information to provide a simple summation of the information collected from the community. In alternative exemplary embodiments, the process request application 112 includes a learning algorithm (e.g., machine learning algorithm) for analyzing and classifying the local information (i.e., data set gathered from the agent nodes 102). The learning algorithm is developed for extracting rules and patterns out of data sets that comprise the local information. By way of non-limiting examples, a self-learning model may be employed (e.g., J48, an implementation of the Quinlan algorithm) for implementing the process requests. These, and other features, of the agent profile processes will be described further in FIGS. 2 and 3.

Figure 2A:
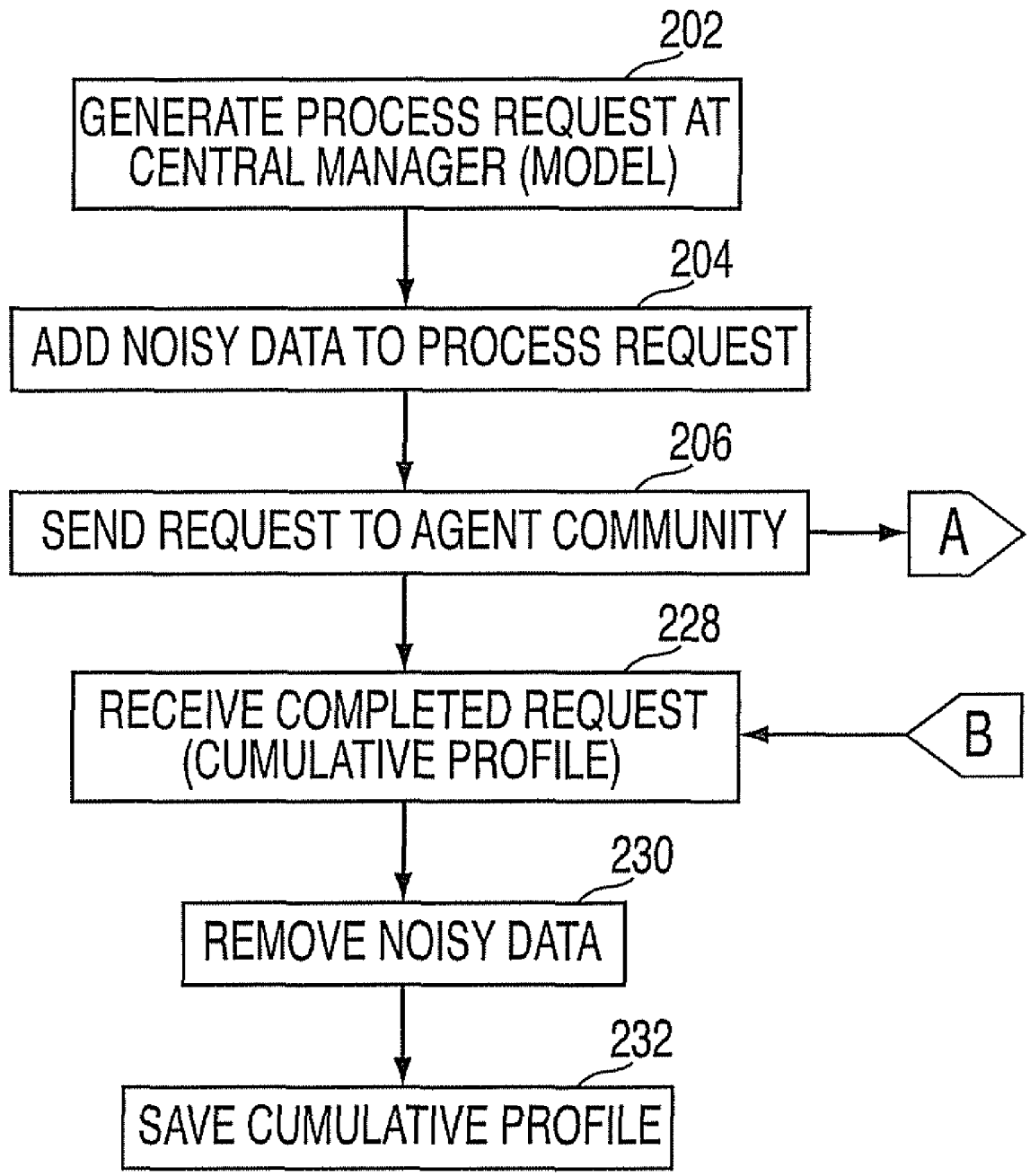
FIGS. 2A-2B are flow diagrams that describe processes for implementing the agent profile processes in exemplary embodiments.
Figure 2B:
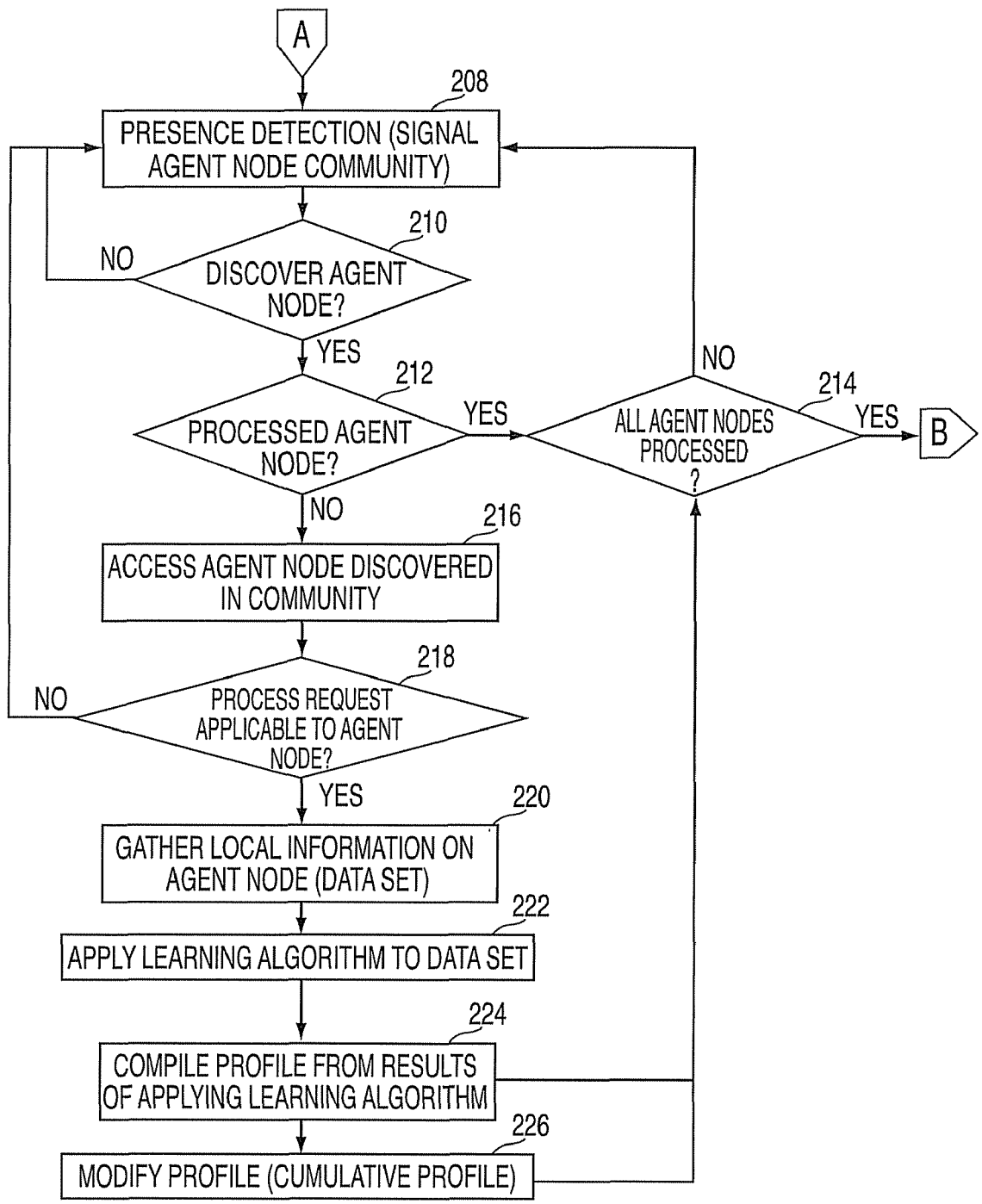

Turning now to FIGS. 2A and 2B, a flow diagram describing a process for implementing the agent profile activities in exemplary embodiments will now be described. The process steps described in FIG. 2A are performed by the central manager system 104, while the process steps described in FIG. 2B are performed by the process request 116 generated by the process request application 112.

At step 202, central manager system 104 generates a process request 116. The process request may be created in response to a request for profile information from offering agent entity 108. The process request 116 is configured to collect non-private information, e.g., information that does not personally identify any individual in the community. As indicated above, the process request 116 generated includes one or more rules for discovering each of the agent nodes 102 in the community. The process request 116 also includes one or more rules for accessing local information stored on each of the agent nodes (e.g., what type of information is sought). The local information represents, e.g., data relating to activities conducted by end users at each of the agent nodes 102. As described above, the process request 116 may also include a learning algorithm for analyzing and classifying data from the local information gathered. The learning algorithm may be implemented using various methodologies, e.g., a decision tree generated via a self-learning model (e.g., J48), cumulative model, etc. However, it will be understood that simpler techniques for processing the data may be employed as well.

At step 204, the central manager system 104 adds noisy data to the process request 116. The noisy data may include false, incorrect, or irrelevant values, etc. Its purpose is to prevent others from acquiring or deducing information about the user nodes 102 which have been processed. The noisy data aids in securing the personal or identifying information at any location in the transmission path (e.g., via network 106) that is followed by the process request 116. For example, if two user nodes A and B have been traversed and a third node C is accessed by the process request 116, then the user of node C may be able to deduce personal identifying data about nodes A and B based upon the collective data acquired from A and B (e.g., a simple process of deduction). Alternatively, if the process request 116 is hacked by a third party entity, this noisy data would prevent the hacker from identifying the nodes. By pre-populating a process request 116 with noisy data, the false values provided therein ensure the integrity of data gleaned from the information collection should a network compromise become detected.

At step 206, the process request 116 is transmitted to the agent community via network 106 and the agent profile processes continue in FIG. 2B.

As shown in FIG. 2B, the process request 116 ascertains the presence of any agent nodes 102 in the network 106 at step 208. This may be implemented via a discovery signal transmitted via the network 106. At step 210, it is determined whether an agent node 102 has been discovered (e.g., via a return signal received from the agent node 102). If not, the process returns to step 208 and the process request 116 continues to search for the presence of an agent node 102 in the network 106. As indicated above, the progress of the process request 116 in the network 106 may be tracked via the individual agent nodes 102 (e.g., via respective user agent applications 110) as it traverses through the network 106. This tracking may be implemented using a variety of techniques. For example, if there are a fixed number of nodes in the network community, the tracking may be accomplished using a counter. Another technique may be to use a counter for specifying a fixed number of nodes 102 to which the request 116 will process before returning to the central manager system 104. In yet another example, the tracking may be accomplished by pre-defined parameters set within the request 116 (e.g., when sampled data indicates that a threshold has been reached, such as "end traversal when data indicates that 100 purchases at Amazon.com™ have been determined").

If an agent node 102 is detected at step 210, it is determined whether the agent node 102 detected has been previously processed via the request 116, (i.e., has the process request 116 accessed this node in the community already). If so, it is determined whether the process request 116 has accessed all agent nodes 102 in the community at step 214 (i.e., has the process request 116 completed its traversal of each agent node in the community; has the process request 116 completed its traversal based upon parameters set within the request 116, etc.). If so, the process returns to FIG. 2A. Otherwise, the process request 116 accesses the agent node 102 discovered in step 216.

At step 218, it is determined whether the process request 116 is applicable for the accessed node 102. For example, if the process request 116 has been configured to acquire or collect information regarding males 18-30, and the node 102 accessed is associated with a male over 40, then the process request 116 would not apply for this node 102. If the process request 116 is not applicable to the accessed node 102, the process returns to step 208. Otherwise, the process request 116 gathers local information stored on the agent node 102. The local information gathered forms a data set for the particular agent node 102 being processed.

At step 222, the process request 116 applies a learning algorithm to the local information (i.e., data set). Alternatively, as described above, the process request 116 may include a set of instructions for performing simple summations of the information. If a learning algorithm is employed, a decision tree may be created and processed by the learning algorithm. The decision tree may be generated via a specified classifier, wherein nodes in the decision tree are represented by the rules for analyzing and classifying which act on selected data comprising the local information stored in each of the agent nodes 102 in the community.

If the agent node 102 is the first node accessed by the process request 116, the process request 116 compiles a profile from results of the application of the learning algorithm (or set of instructions) at step 224 and the process returns to step 214. Otherwise, if the agent node 102 is not the first node accessed by the process request 116, the existing profile created at the first node (or preceding nodes) is modified by the process request 116. The profile provides cumulative information resulting from the analyzing and classifying. The cumulative profile includes generic information that is descriptive of collective activities conducted by the end users and is absent information that personally identifies any of the end users. A sample cumulative profile 300 for the community of user agents 102 is shown in FIG. 3.

The profile is modified at each agent node in response to the gathering, analyzing and classifying activities described above, resulting in cumulative profile at each agent node. The cumulative profile may be modified via the learning algorithm.

Returning to FIG. 2A, the process request 116 and completed profile are returned to the central manager system 104 at step 228. The central manager system 104 removes the noisy data that was incorporated into the process request 116 at step 230 and saves the cumulative profile in storage device 114 at step 232. The cumulative profile may be distributed to offering agent entity 108 which requested the profile.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for gathering information and statistics from a community of agent nodes in a network, comprising:
   generating a process request, including:
   a rule for discovering each of the agent nodes in the community;
   a rule for accessing local information stored on each of the agent nodes, the local information representing at least activities conducted by end users at each of the agent nodes; and
   a set of rules operable for:
   classifying data comprising the local information at each of the agent nodes; and
   developing a cumulative profile resulting from the classifying, the cumulative profile including generic information that is descriptive of collective activities conducted by the end users;

the cumulative profile devoid of information that personally identifies any of the end users;

transmitting the process request to a first agent node in the community; and preventing extraction of specified information at any location in a transmission path followed by the process request among the agent nodes, the preventing including:

pre-populating the process request with noisy data prior to transmission; and removing the noisy data from the process request when the cumulative profile is returned from the last agent node in the community.

2. The method of claim 1, further comprising:

securing the identity of the end users by pre-populating the noisy data, the noisy data comprising false, incorrect, and irrelevant data.

3. The method of claim 1, wherein the set of rules includes a learning algorithm, the learning algorithm implemented by a decision tree generated via a specified classifier, wherein nodes in the decision tree are represented by rules for analyzing and classifying selected data comprising the local information stored in each of the agent nodes in the community.

4. The method of claim 3, wherein the cumulative profile is modified via the learning algorithm at each of the agent nodes, the modification based upon the local information gathered and analyzed at each of the agent nodes in the community.

5. The method of claim 1, wherein the community of agent nodes is a grid-implemented community.

6. The method of claim 1, wherein the community of agent nodes is implemented via a peer-to-peer network.

7. A system for gathering information and statistics from a community of agent nodes in a network, comprising:

a computer processing device; and a process request application executing on the computer processing device, the process request application implementing a method, comprising:

generating a process request, including:

a rule for discovering each of the agent nodes in the community;

a rule for accessing local information stored on each of the agent nodes, the local information representing at least activities conducted by end users at each of the agent nodes; and a set of rules operable for:

classifying data comprising the local information at each of the agent nodes; and developing a cumulative profile resulting from the classifying, the cumulative profile including generic information that is descriptive of collective activities conducted by the end users the cumulative profile devoid of information that personally identifies any of the end users;

transmitting the process request to a first agent node in the community; and preventing extraction of specified information at any location in a transmission path followed by the process request among the agent nodes, the preventing including:

pre-populating the process request with noisy data prior to transmission; and removing the noisy data from the process request when the cumulative profile is returned from the last agent node in the community.

8. The system of claim 7, wherein the method further comprises:

securing the identity of the end users by pre-populating the noisy data, the noisy data comprising false, incorrect, and irrelevant data.

9. The system of claim 7, wherein the set of rules includes a learning algorithm, the learning algorithm implemented by a decision tree generated via a specified classifier, wherein nodes in the decision tree are represented by rules for analyzing and classifying selected data comprising the local information stored in each of the agent nodes in the community.

10. The system of claim 9, wherein the cumulative profile is modified via the learning algorithm at each of the agent nodes, the modification based upon the local information gathered and analyzed at each of the agent nodes in the community.

11. The system of claim 7, wherein the community of agent nodes is a grid-implemented community.

12. The system of claim 7, wherein the community of agent nodes is implemented via a peer-to-peer network.

13. A computer program product comprising a storage medium storing instructions, which when executed by a computer implement a service for gathering information and statistics from a community of agent nodes in a network, the computer program product implementing a method, the method comprising:

generating a process request, including:

a rule for discovering each of the agent nodes in the community;

a rule for accessing local information stored on each of the agent nodes, the local information representing at least activities conducted by end users at each of the agent nodes; and a set of rules operable for:

classifying data comprising the local information at each of the agent nodes; and developing a cumulative profile resulting from the classifying, the cumulative profile including generic information that is descriptive of collective activities conducted by the end users;

the cumulative profile devoid of information that personally identifies any of the end users;

transmitting the process request to a first agent node in the community; and preventing extraction of specified information at any location in a transmission path followed by the process request among the agent nodes, the preventing including:

pre-populating the process request with noisy data prior to transmission; and removing the noisy data from the process request when the cumulative profile is returned from the last agent node in the community.

14. The computer program product of claim 13, wherein the method further comprises:

securing the identity of the end users by pre-populating the noisy data, the noisy data comprising false incorrect and irrelevant data.

15. The computer program product of claim 13, wherein the set of rules includes a learning algorithm, the learning algorithm implemented by a decision tree generated via a specified classifier, wherein nodes in the decision tree are represented by rules for analyzing and classifying selected data comprising the local information stored in each of the agent nodes in the community.

16. The computer program product of claim 15, wherein the cumulative profile is modified via the learning algorithm at each of the agent nodes, the modification based upon the local information gathered and analyzed at each of the agent nodes in the community.

17. The computer program product of claim 13, wherein the community of agent nodes is at least one of a:
   grid-implemented community; and
   a peer-to-peer network.

18. A service for gathering information and statistics from a community of agent nodes in a network, comprising:
   generating a process request, including:
      a rule for discovering each of the agent nodes in the community;
      a rule for accessing local information stored on each of the agent nodes, the local information representing at least activities conducted by end users at each of the agent nodes; and
      a set of rules operable for:
         classifying data comprising the local information at each of the agent nodes; and
         developing a cumulative profile resulting from the classifying, the cumulative profile including generic information that is descriptive of collective activities conducted by the end users; the cumulative profile devoid of information that personally identifies any of the end users; and
      transmitting the process request to a first agent node in the community; and preventing extraction of specified information at any location in a transmission path followed by the process request among the agent nodes, the preventing including:
         pre-populating the process request with noisy data prior to transmission; and
         removing the noisy data from the process request when the cumulative profile is returned from the last agent node in the community.

19. The service of claim 18, wherein the set of rules includes a learning algorithm, the learning algorithm implemented by a decision tree generated via a specified classifier, wherein nodes in the decision tree are represented by rules for analyzing and classifying selected data comprising the local information stored in each of the agent nodes in the community.

20. The service of claim 18, wherein the cumulative profile is modified via the learning algorithm at each of the agent nodes, the modification based upon the local information gathered and analyzed at each of the agent nodes in the community.

* * * * *